(12) United States Patent
Labbe et al.

(10) Patent No.: US 12,537,437 B2
(45) Date of Patent: Jan. 27, 2026

(54) SINGLE CONTROL SIGNAL GENERATION IN POWER STAGE CONTROLLER

(71) Applicant: Renesas Electronics Corporation, Tokyo (JP)

(72) Inventors: Benoit Labbe, Harlow (GB); Adam Matthew Bumgarner, Duluth, GA (US); Vinod Aravindakshan Lalithambika, Harlow (GB); Allan Richard Warrington, Harlow (GB)

(73) Assignee: Renesas Electronics Corporation, Tokyo (JP)

( * ) Notice: Subject to any disclaimer, the term of this patent is extended or adjusted under 35 U.S.C. 154(b) by 233 days.

(21) Appl. No.: 18/454,399

(22) Filed: Aug. 23, 2023

(65) Prior Publication Data

US 2025/0070643 A1    Feb. 27, 2025

(51) Int. Cl.
*H02M 1/08* (2006.01)
*H02M 1/00* (2006.01)

(52) U.S. Cl.
CPC ......... *H02M 1/082* (2013.01); *H02M 1/0009* (2021.05); *H02M 1/0025* (2021.05);

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10;

(Continued)

(56) References Cited

U.S. PATENT DOCUMENTS 5,867,379 A * 2/1999 Maksimovic ....... H02M 1/4225
                                                          323/222
6,246,222 B1 * 6/2001 Nilles ................. H02M 3/1584
                                                          323/283

(Continued)

OTHER PUBLICATIONS

S. Bari, Q. Li and F. C. Lee, "A new current mode constant on time control with ultrafast load transient response," 2016 IEEE Applied Power Electronics Conference and Exposition (APEC), Long Beach, CA, USA, 2016, pp. 3259-3265, doi: 10.1109/APEC.2016.7468333. 7 pages.

(Continued)

*Primary Examiner* — Sean Kayes
*Assistant Examiner* — Nusrat Quddus
(74) *Attorney, Agent, or Firm* — SCULLY, SCOTT, MURPHY & PRESSER, P.C.

(57) ABSTRACT

A controller for controlling a power stage having one or more phases is presented. The controller includes a reference circuit that generates a reference signal; a ramp generator generating a feedback ramp signal based on a feedback signal of the power stage; and a modulator generating a control signal for controlling at least one phase of the power stage. The control signal may include a series of pulses in which each pulse is associated with a corresponding phase of the power stage.

19 Claims, 19 Drawing Sheets

(58) Field of Classification Search
CPC ........ H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; B23K 11/24; H04B 2215/069; H02J 3/46; H02J 3/38
See application file for complete search history.

(56) References Cited

U.S. PATENT DOCUMENTS

| | | | | |
|---|---|---|---|---|
| 6,285,174 B1* | 9/2001 | Suzuki | ........ | H02M 3/156 323/288 |
| 6,657,417 B1* | 12/2003 | Hwang | ........ | G05F 1/70 363/84 |
| 9,136,829 B2* | 9/2015 | Nene | ........ | H03K 4/026 |
| 9,444,338 B1* | 9/2016 | Pastorina | ........ | G05F 1/10 |
| 9,484,800 B2* | 11/2016 | Faingersh | ........ | H02M 1/36 |
| 10,020,738 B2* | 7/2018 | Cai | ........ | H02M 1/14 |
| 10,063,143 B1* | 8/2018 | Fan | ........ | H02M 5/458 |
| 10,270,343 B2* | 4/2019 | Nguyen | ........ | H02M 3/1584 |
| 10,707,761 B1* | 7/2020 | Couleur | ........ | H02M 3/1582 |
| 10,811,978 B1* | 10/2020 | Zheng | ........ | H02M 3/33592 |
| 11,876,456 B2* | 1/2024 | Archibald | ........ | H02M 3/1586 |
| 12,328,070 B2* | 6/2025 | Bawa | ........ | H02M 3/158 |
| 2002/0140407 A1* | 10/2002 | Hwang | ........ | H02M 1/4225 323/207 |
| 2008/0310200 A1* | 12/2008 | Maksimovic | ........ | H02M 3/1584 363/65 |
| 2009/0251178 A1* | 10/2009 | Choi | ........ | H03K 4/50 327/131 |
| 2010/0033215 A1* | 2/2010 | Fogg | ........ | H03K 4/50 327/137 |
| 2010/0141225 A1* | 6/2010 | Isham | ........ | H02M 3/156 332/112 |
| 2011/0062932 A1* | 3/2011 | Hawkes | ........ | H02M 3/156 323/288 |
| 2013/0300388 A1* | 11/2013 | Laur | ........ | H02M 3/156 323/282 |
| 2014/0176097 A1* | 6/2014 | Huang | ........ | G05F 1/59 323/272 |
| 2015/0137776 A1* | 5/2015 | Thomas | ........ | H02M 3/1588 323/271 |
| 2015/0311798 A1* | 10/2015 | Yuan | ........ | H02M 3/156 323/288 |
| 2016/0233772 A1* | 8/2016 | Renauer | ........ | H02M 3/158 |
| 2016/0336957 A1* | 11/2016 | Bernardinis | ........ | H03K 7/08 |
| 2019/0229612 A1* | 7/2019 | Chen | ........ | H02M 3/158 |
| 2021/0126537 A1* | 4/2021 | Lalithambika | ........ | H02M 3/158 |
| 2021/0247788 A1* | 8/2021 | Chen | ........ | H02M 3/158 |
| 2021/0296989 A1* | 9/2021 | Chen | ........ | H02M 1/08 |
| 2021/0296995 A1* | 9/2021 | Zhang | ........ | H02M 3/158 |
| 2021/0376730 A1* | 12/2021 | Yan | ........ | H02M 3/1584 |
| 2024/0146191 A1* | 5/2024 | Fagnani | ........ | H02M 3/158 |
| 2024/0168065 A1* | 5/2024 | Lee | ........ | H02M 3/158 |
| 2025/0202362 A1* | 6/2025 | Tsou | ........ | H02M 1/0009 |

OTHER PUBLICATIONS

K.-Y. B. Cheng and M. Direnzo, "Auto-tuning of hybrid ripple-based constant on-time control for fast load transients and dynamic voltage transitions of multiphase voltage regulators," 2017 IEEE Applied Power Electronics Conference and Exposition (APEC), Tampa, FL, USA, 2017, pp. 224-229, doi: 10.1109/APEC.2017.7930697. 6 pages.

B. Labbe, D. Chesneau, B. Allard and X. Lin-Shi, "Modeling and design of an integrated sliding-mode buck converter with regulated switching frequency suitable for mobile devices," 2013 IEEE ECCE Asia Downunder, Melbourne, VIC, Australia, 2013, pp. 893-899, doi: 10.1109/ECCE-Asia.2013.6579211. 7 pages.

R. Redl and J. Sun, "Ripple-Based Control of Switching Regulators—An Overview," in IEEE Transactions on Power Electronics, vol. 24, No. 12, pp. 2669-2680, Dec. 2009, doi: 10.1109/TPEL.2009.2032657. 12 pages.

* cited by examiner

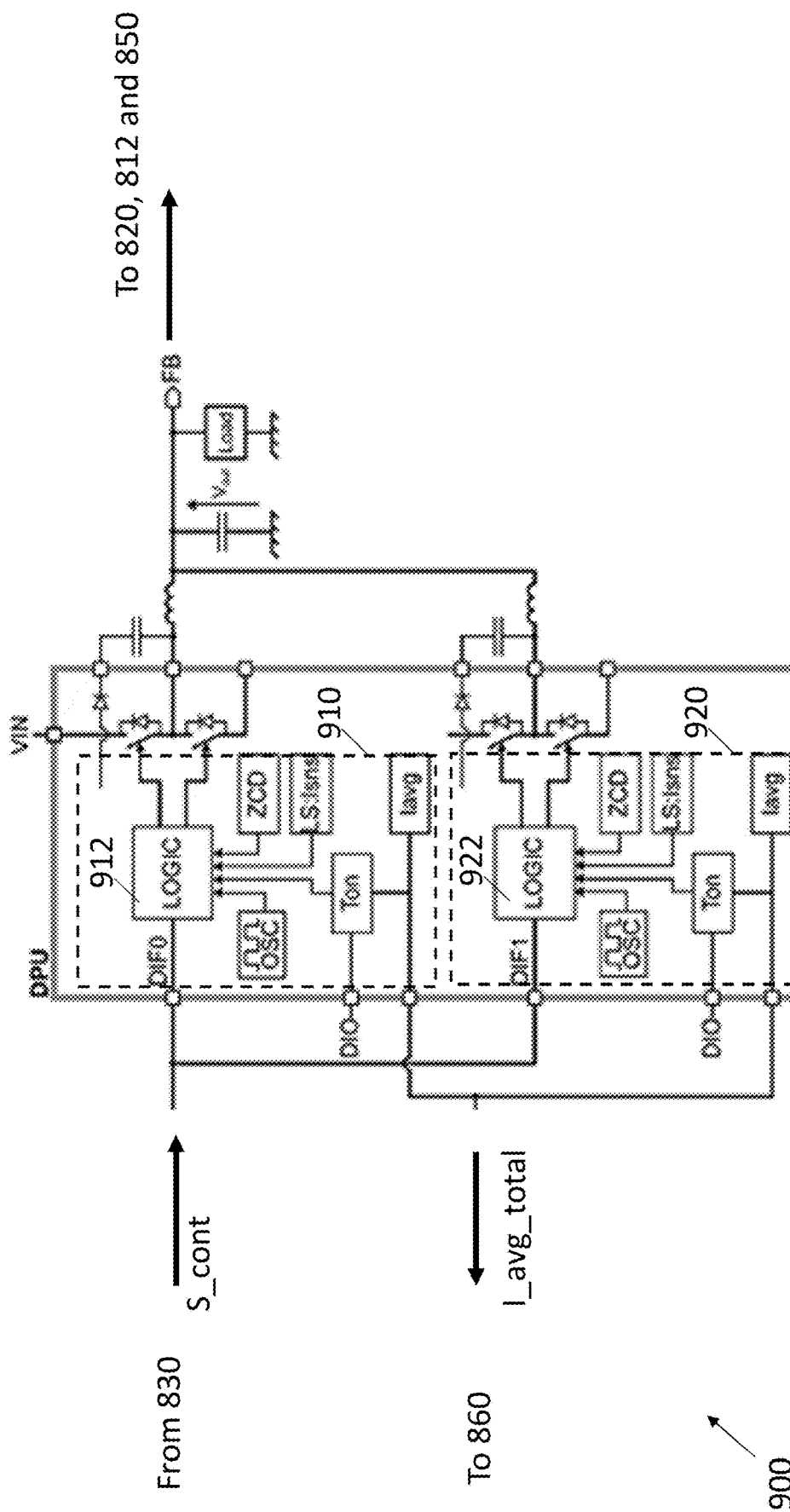

SINGLE CONTROL SIGNAL GENERATION IN POWER STAGE CONTROLLER

TECHNICAL FIELD

The present disclosure relates to a controller for controlling a power stage. In particular, the present disclosure relates to a controller for controlling a constant on-time (COT) converter.

BACKGROUND

Constant-on-time switching converters present several of advantages over other types of switching converters including a fast transient response, a high efficiency under light load and a smooth transition from continuous conduction mode CCM to discontinuous conduction mode DCM of operation.

COT converters can also be implemented with multiple phases, however conventional multi-phase COTs require complex routing signals. This increases the footprint of the power supply and limit system integration. It is an object of the disclosure to address one or more of the above mentioned limitations.

SUMMARY

According to a first aspect of the disclosure there is provided a controller for controlling a power stage having one or more phases, the controller comprising a reference circuit adapted to generate a reference signal; a ramp generator adapted to generate a feedback ramp signal based on a feedback signal of the power stage; and a modulator adapted to generate a control signal for controlling at least one phase of the power stage.

Optionally, the feedback ramp signal has a frequency that is function of number of active phases of the power stage.

Optionally, the control signal comprises a series of pulses, each pulse being associated with a corresponding phase of the power stage.

Optionally, each pulse is associated with an on-time of the corresponding phase.

Optionally, the modulator comprises a comparator adapted to compare the feedback ramp signal with the reference signal to obtain a modulation signal; a sampling circuit configured to sample the modulation signal and to generate a digital modulation signal; a logic circuit configured to generate the control signal based on the digital modulation signal; and an oscillator coupled to the sampling circuit and the logic circuit.

For instance the sampling circuit may comprise a first memory device coupled in series to a second memory device. The memory devices may be D flip-flops.

Optionally, the logic circuit comprises a counter configured to calculate a duration between successive pulses of the control signal.

Optionally, the logic circuit is configured to encode the digital modulation signal for a specific protocol.

Optionally, the logic circuit is a state machine. For instance the state machine may be a finite state machine FSM.

Optionally, the ramp generator comprises a capacitor; a first transconductance amplifiers coupled to the capacitor via a first switch; a second transconductance amplifiers coupled to the capacitor via a second switch; and a timer configured to control the first and second switches.

Optionally, the controller comprises a closed loop operational amplifier.

Optionally, the controller further comprises a duty cycle estimator configured to estimate a duty cycle of the power stage and a ramp amplitude adjuster configured to adjust an amplitude of the feedback ramp signal based on the estimate a duty cycle.

According to a second aspect of the disclosure there is provided a power supply according to the first aspect, coupled to a power stage having one or more phases.

Optionally, the controller is coupled to the power stage via a single wire interface. For instance the single wire interface may be a single wire modulation transport interface.

Optionally, the power stage comprises a plurality of phases, each phase comprising a high side power switch coupled to a low side power switch at a switching node.

Optionally, wherein for each phase the power stage comprises a driver; and wherein the driver comprises a decoder for decoding the control signal.

Optionally, the decoder is configured to measure a pulse width of each pulse of the control signal and compare the measured pulse width with a predefined pulse width value.

Optionally, the power supply is a constant on time converter.

According to a third aspect of the disclosure there is provided a method of controlling a power stage having one or more phases, the method comprising:
generating a reference signal;
generating a feedback ramp signal based on a feedback signal of the power stage; and
generating a control signal for controlling at least one phase of the power stage.

Optionally, the control signal is a single control signal.

Optionally, the method comprises calculating a duration between successive pulses of the control signal; and activating one or more phases if the duration is less than a first threshold value; or deactivating one or more phases if the duration is more than a second threshold.

The first threshold value may be a minimum duration value and the second threshold value may be a maximum duration value.

DESCRIPTION OF THE DRAWINGS

The disclosure is described in further detail below by way of example and with reference to the accompanying drawings, in which:

FIG. 9 illustrates an exemplary implementation of a power stage with two phases for use with the controller of FIG. 8A;

DESCRIPTION

Figure 1:
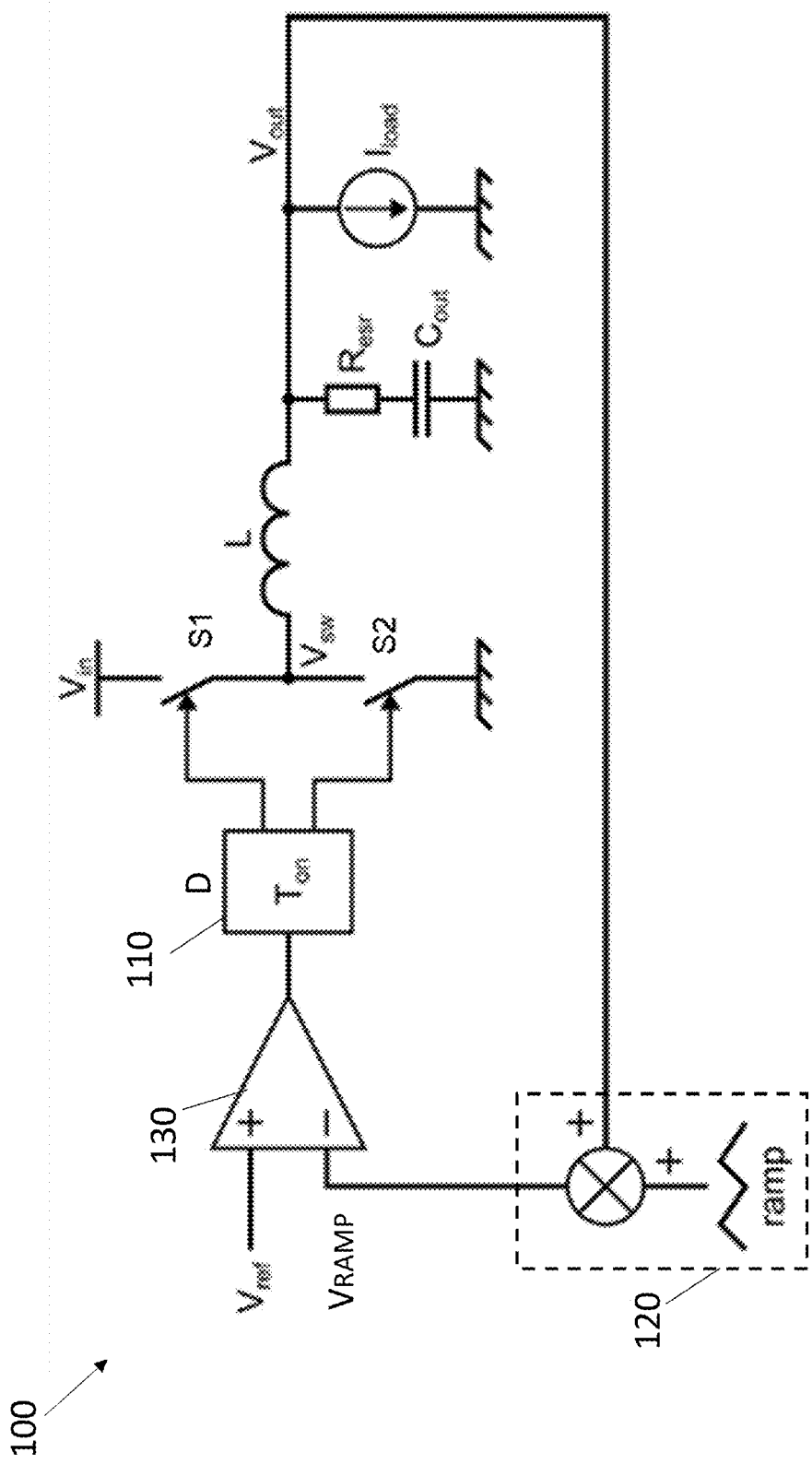
FIG. 1 is a diagram of a conventional constant on-time buck converter.

FIG. 1 is a diagram of a conventional constant on-time (CoT) buck converter. The converter 100 includes a high side power switch S1, a low side power switch S2, an inductor L, a driver 110, and an output regulation loop for regulating an output voltage of the converter. The output regulation loop includes a ramp generator 120 for generating a feedback ramp signal $V_{RAMP}$, and a Pulse Width Modulation PWM comparator 130. The Pulse Width Modulation PWM comparator 130 has a first input for receiving a reference signal Vref, a second input for receiving the feedback ramp voltage $V_{RAMP}$, and one output coupled to the driver 110.

Figure 2:
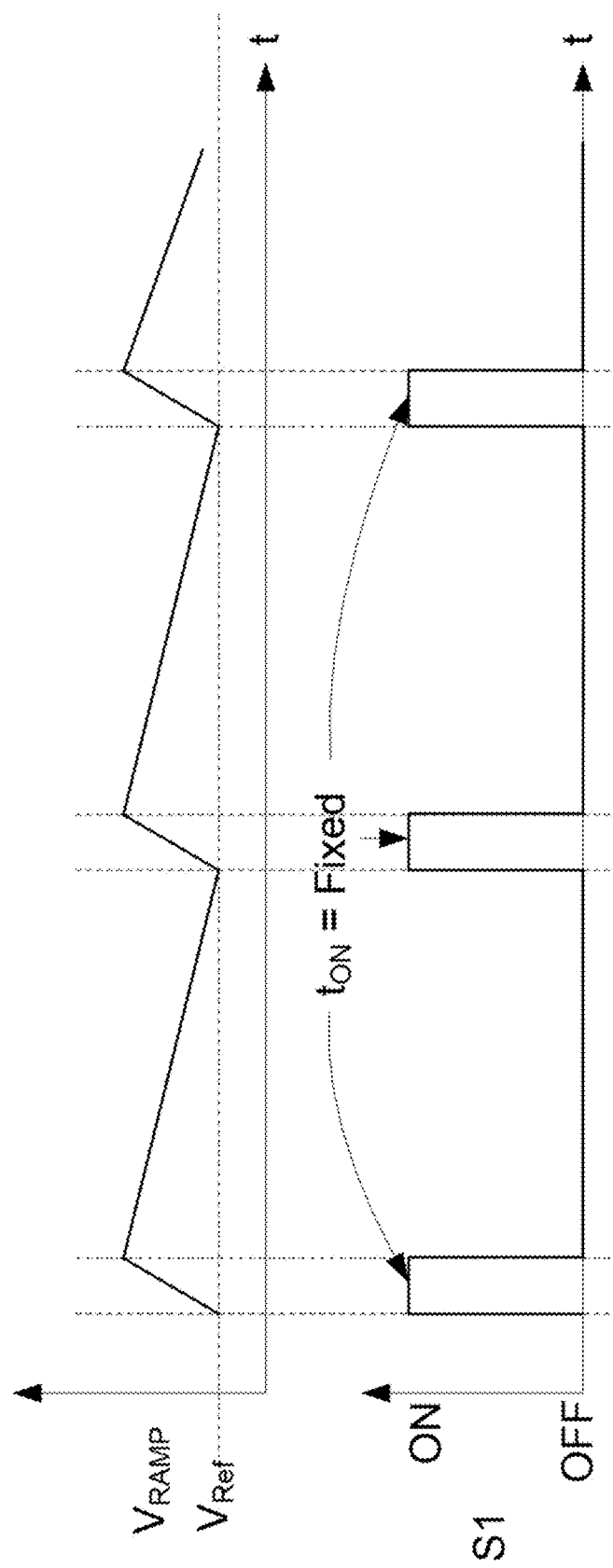
FIG. 2 is a plot of the ramp voltage as a function of time, illustrating the operation of the converter of FIG. 1.

FIG. 2 is a plot illustrating the operation of the converter of FIG. 1. The top waveform shows the feedback reference voltage and the bottom waveform shows the state (on or off) of the switch S1. In operation, when the feedback ramp voltage $V_{RAMP}$ (=Vout+ramp) reaches Vref, the comparator 130 sends a logic high to the driver 110. The driver 110 then turns on the high side switch S1 for a fixed duration D*T, where D is the duty cycle and T is the switching period, hence the name "constant on-time switching converter". When that fixed duration expires, the driver 110 turns off the switch S1 and turns on the switch S2. The output voltage is regulated to be D*Vin, where Vin is the supply voltage. The ON-time of S1 is pre-determined and is turned OFF once the pre-determined time has been reached. To handle greater output loads, a common technique is to employ multiple power stages in parallel.

Figure 3:
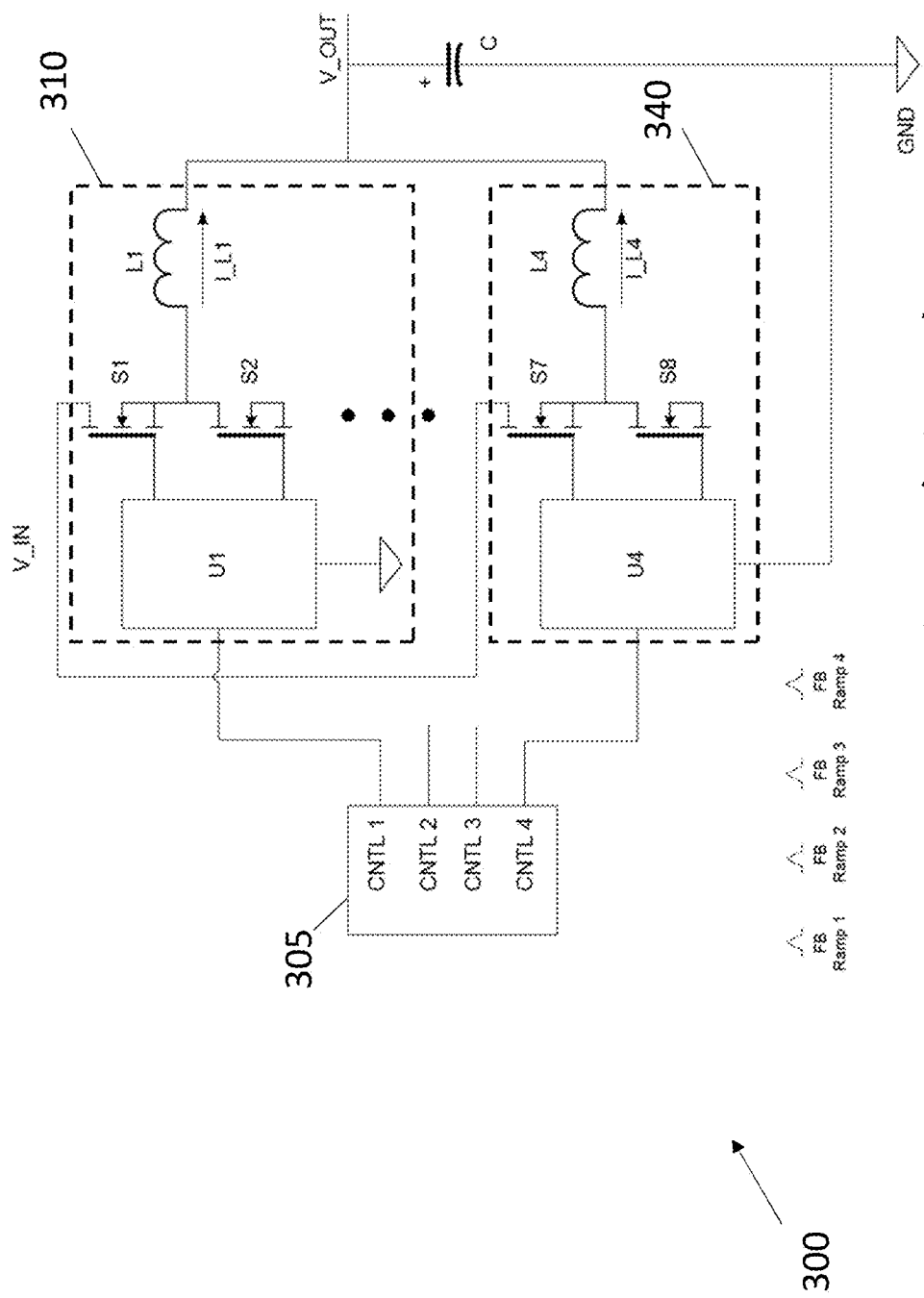
FIG. 3 is a diagram of a conventional multi-phase converter.

FIG. 3 is a diagram of a conventional multi-phase converter. The multi-phase converter 300 illustrates a four-phase buck converter, with four phases coupled in parallel. For clarity only two phases are represented labelled 310 and 340.

Each phase includes a high side power switch coupled to a low side power switch at a switching node, an inductor coupled to the switching node, and a driver U for driving the high side and low side power switches. Each phase contains individual control and feedback. A controller 305 is provided to generate four control signals CNTL 1-CNTL 4 for controlling the drivers U1-U4, respectively. Therefore for each phase there is a separate control signal that derives from a separate ramp signal $V_{RAMP\ 1}$-$V_{RAMP\ 4}$.

An additional controller (not shown) is required to ensure proper operation, for example, for providing load balancing and phase control. Each converter of the multi-phase converter may be implemented as a CoT buck converter.

Figure 4:
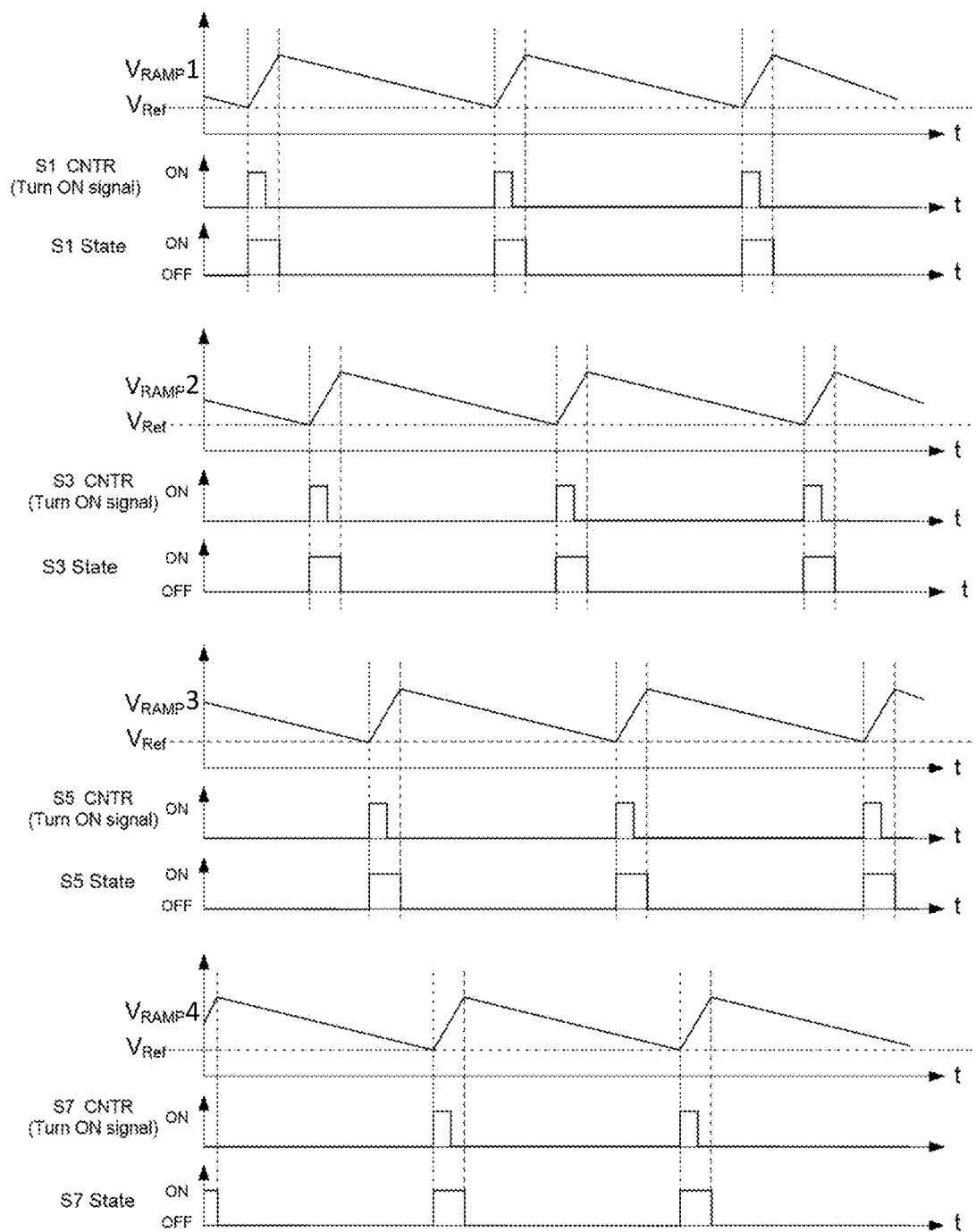
FIG. 4 is a diagram illustrating for each phase of the multi-phase converter of FIG. 3: the feedback ramp voltage, the reference voltage, the control signal and the state of the high-side power switch.

FIG. 4 is a diagram illustrating for each phase of the multi-phase converter of FIG. 3: the feedback ramp voltage, the reference voltage, the control signal and the state of the high-side power switch.

The four phases operate out of phase with each other, although under dynamic load (transient) conditions, the phases my operate in-phase. Each phase is controlled by a separate ramp signal, which determines the ON and OFF states of the power switches. When the ramp voltages equal the reference voltage, a control signal to turn on the power transistor is generated. Once in the ON state, the power transistor will remain on for the pre-defined fixed ON time (CoT).

The converter of FIG. 3 requires a separate control signal (to turn ON and OFF each phase), and a separate feedback ramp signal for each phase. This increases the footprint of the system (e.g. routing signal traces) as well as the susceptibility to noise and reduces system integration.

The converter of FIG. 3 may also be limited by thermal instability. The use of different control and feedback signals for each phase presents a challenge for balancing the ON time and thus load balancing of each phase. If there is an unbalance of output current in each phase, it may result in thermal instability and reduced reliability.

Figure 5:
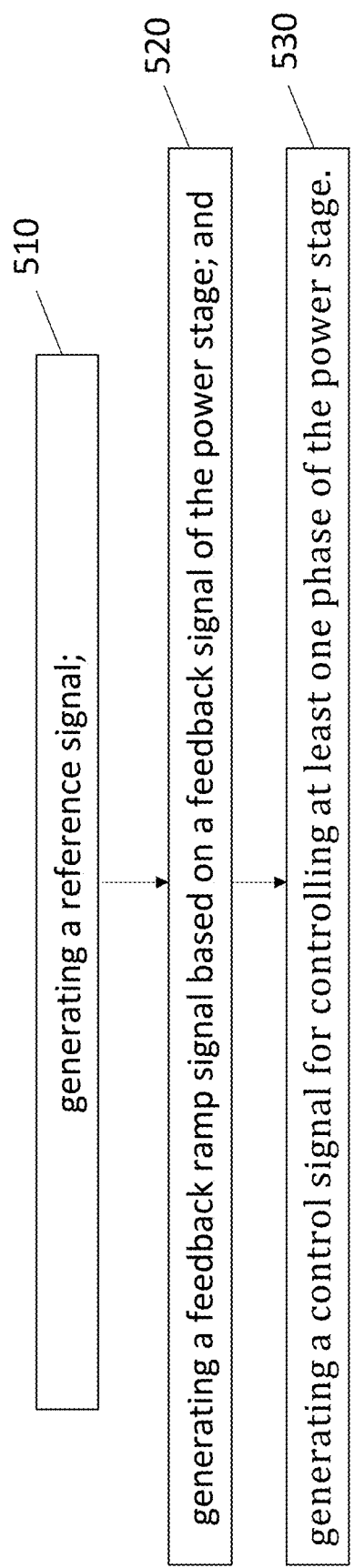
FIG. 5 is a flow chart of a method for controlling a power stage according to the disclosure.

FIG. 5 is a flow chart of a method for controlling a power stage according to the disclosure. The method includes the steps 510 to 530.

At step 510 a reference signal is generated. The reference signal Vref may be chosen to be the desired output voltage. i.e. the converter operates so that Vout=Vref.

At step 520 a feedback ramp signal is generated based on a feedback signal of the power stage. At step 530 a control signal is generated for controlling at least one phase of the power stage.

For instance the power stage may include a plurality of phases, and the control signal is configured to control all phases of the power stage.

Figure 6:
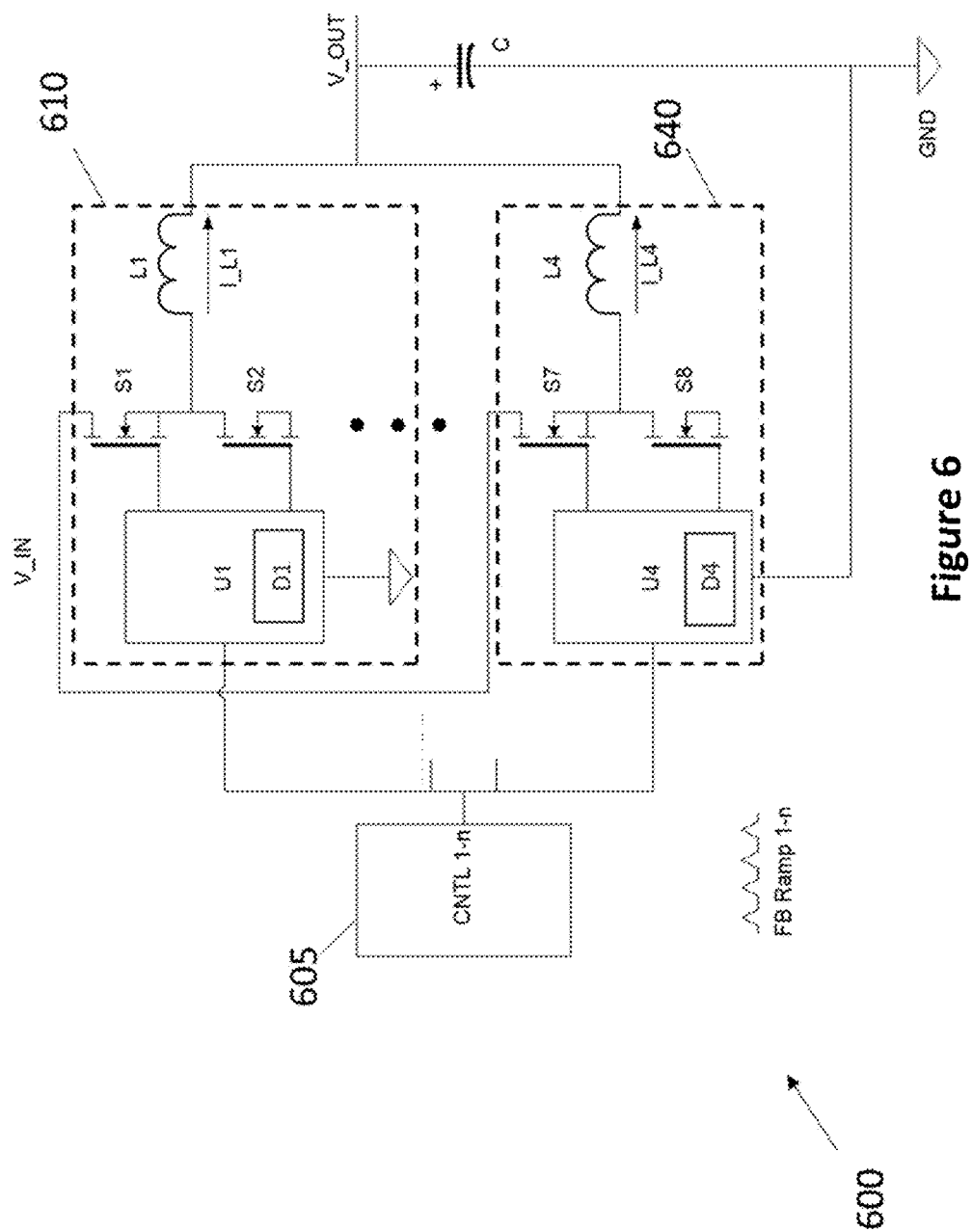
FIG. 6 is a diagram of a power supply according to the disclosure.

FIG. 6 is a diagram of a power supply according to the disclosure. The power supply or converter 600 includes a controller 605 coupled to a power stage comprising four phases coupled in parallel. For clarity only two phases are represented labelled 610 and 640. It will be appreciated that the number of phases may be increased or decreased depending on the application. The controller 605 is coupled to each phase of the power stage via a single connection that splits into several branches (one for each phase of the power stage).

Each phase includes a high side power switch coupled to a low side power switch at a switching node, an inductor coupled to the switching node, and a driver U for driving the high side and low side power switches. Each driver also includes a decoder for decoding the control signal. For instance the driver U1 of the phase 610 includes the decoder D1. Similarly the driver U4 of the phase 640 includes the decoder D4.

The controller 605 is adapted to generate a control signal based on a single feedback ramp signal $V_{RAMP}$. So there is no need for a separate feedback ramp signal for each phase.

The architecture of the power supply 600 is scalable from one to multi-phases. It may be used to increase power density and simplifies system integration.

Figure 7:
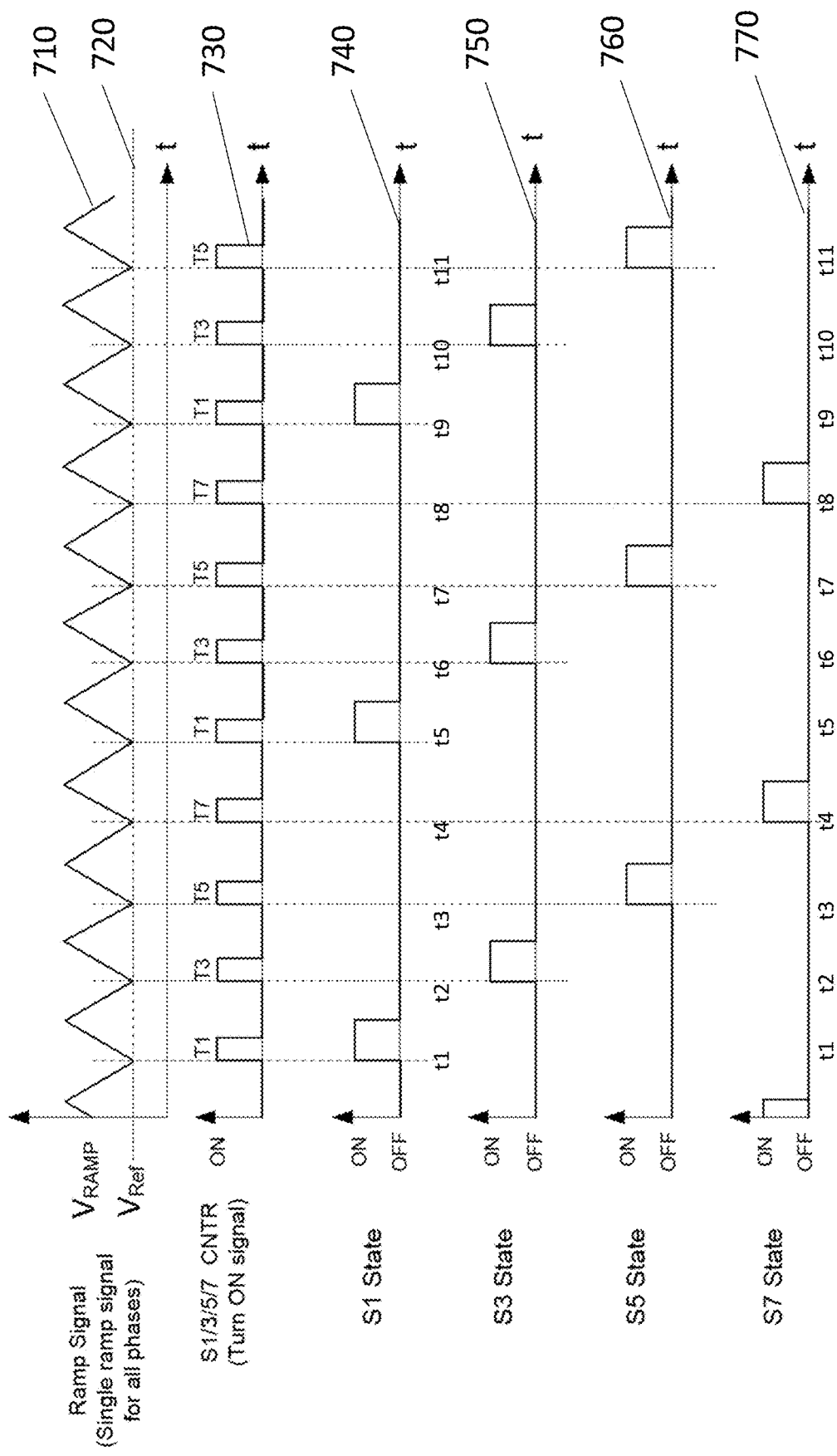
FIG. 7 is a diagram illustrating the operation of the power supply of FIG. 6.

FIG. 7 is a diagram illustrating the operation of the power supply of FIG. 6. FIG. 7 shows the ramp voltage 710, the reference voltage 720 and the control signal 730. Also represented are the states (either on or off) of the high-side power switch of each phase. The state of the high side power switch S1 of the first phase, is represented by waveform 740. The state of the high side power switch S3 of the second phase, is represented by waveform 750. The state of the high side power switch S5 of the third phase is represented by waveform 760. The state of the high side power switch S7 of the fourth phase, is represented by waveform 770.

In operation, the controller 605 generates a single control signal 730 to initiate the turn ON state of all phases (1 to n, in this example n=4). The control signal 730 is formed of a plurality of pulses. In this example the pulses T1, T3, T5 and T7 are used for switching the high side power switches S1, S3, S5 and S7, respectively. A pulse directed to a particular phase may have a specific pulse width. So the pulses T1, T3, T5 and T7 may have different pulse widths.

Each driver receives the same control signal 730, then the decoder present in the driver decodes the control signal to only pass the relevant pulse. For instance the decoder D1 passes the pulse T1 directed to the power switch S1 and blocks the other pulses T3, T5 and T7. Similarly the decoder D4 passes the pulse T7 directed to the power switch S7 and blocks the other pulses T1, T3 and T5.

To identify the relevant pulse, the decoder may measure the pulse width of each pulse received and then compare the measured pulse width with a predefined pulse width value. If the pulse width is equal to the predefined value the pulse is passed, otherwise the pulse is blocked. The decoder may be implemented in various ways, either using analog or digital circuitry.

The power converter 600 uses a single wire modulation transport interface (SWMTI) to transport the control signal through a single wire for any possible number n of drivers for n phases. This approach minimizes the need for other communication between the controller 605 and the drivers. The controller 605 only requires a connection to the power input voltage and the output voltage of the converter but no connection to the switching nodes is required. The power converter 600 auto-optimize its operation for any possible duty cycle of operation. For instance the slope of the ramp may be adjusted to the operating conditions.

Figure 8A:
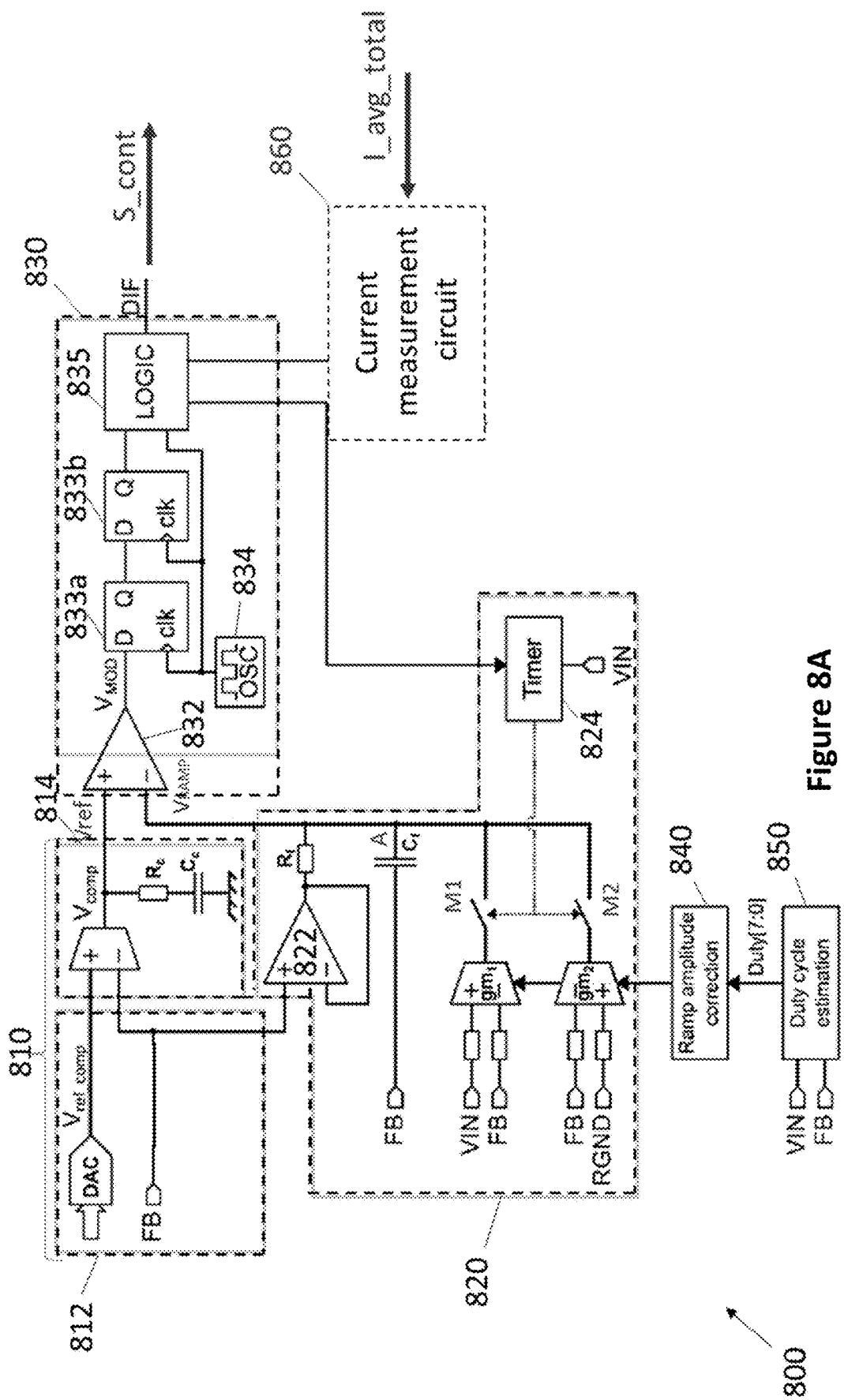
FIG. 8A is a diagram of an exemplary implementation of the controller of FIG. 6.

FIG. 8A illustrates an exemplary implementation of the controller of FIG. 6. The controller 800 has several input ports for receiving input voltage VIN, a feedback signal FB from the power converter and optionally the total average current from all phases. It also includes an output port for communicating with the multi-phase power stage via single wire modulation transport interface (SWMTI). The signal FB may be equal to VOUT. Alternatively the feedback signal may be a function of VOUT, for instance FB may be defined as FB=Vout−X or FB=Vout/X in which X is a constant value.

The controller 800 includes a reference circuit 810 for generating a reference signal, a ramp generator 820 for generating a feedback ramp signal, and a modulator 830 adapted to generate a control signal for controlling a plurality of drivers of the multi-phase power stage.

The reference circuit 810 includes a feedback circuit 812 coupled to a compensator circuit 814. The feedback circuit 812 has a DAC for generating a compensated reference signal Vref_comp. The compensator circuit 814 includes a transconductance amplifier having a first input for receiving the signal Vref_comp and a second input for receiving the feedback signal FB. The output of the reference circuit 810 is the reference voltage Vref.

The modulator 830 includes a comparator 832, two D flip-flops 833a, 833b coupled in series, an oscillator 834 and a logic circuit 835 for generating the control signal. The comparator 832 has first input for receiving the reference signal Vref, a second input for receiving the feedback ramp signal $V_{RAMP}$ and an output for providing a modulated signal $V_{MOD}$ to the D input of the first flip-flop 833a. When Vref>$V_{RAMP}$, then $V_{MOD}$ is high (logic 1) otherwise $V_{MOD}$ is low (logic 0).

Comparing the ramp signal Vramp directly with Vref may leads to some inaccuracy of the DC output voltage. Thus adding a small correction using the transconductance amplifier and the Rc Cc network of the circuit 814 is used to compensate for that small error. However, this is not always necessary and Vref can be fed directly at the Vcomp node.

The D flip-flops 833a and 833b form a sampling circuit. It is used to sample the modulated signal $V_{MOD}$ and to provide a digital modulation signal at the input of the logic circuit 835. The logic circuit 835 may be a state machine configured to encode the digital version of the modulated signal for a specific protocol. Different protocols may be associated with different algorithms implemented by the state machine. The logic circuit 835 may also include a period counter (not shown) to calculate the duration or period between successive pulses of the control signal (See control signal 730 in FIG. 7).

The counter measures the time between two toggling of the comparator output signal, Vmod. The output of the logic circuit 835 is the control signal S_cont.

The ramp generator 820 includes two transconductance amplifiers gm1 and gm2. Each transconductance amplifier is coupled to a common node A via a corresponding switch M1 and M2, respectively. The first transconductance amplifiers gm1 receives the input voltage VIN and a feedback voltage FB. The second transconductance amplifiers gm2 receives the feedback voltage FB and ground. A capacitor Cf is provided having a first terminal coupled to the feedback voltage FB and a second terminal coupled to node A.

A closed loop operational amplifier 822 is provided having a non-inverting input coupled to the feedback shifter of circuit 810 and an inverted input coupled to the amplifier output in a closed loop. The output of the amplifier 822 is coupled to node A via a resistance Rf.

The output impedance of the closed loop amplifier 822 can be high but less than Rf. A fast feedback path is provided through Cf. The closed loop amplifier 822 is used to place the feedback ramp average voltage at the desired level. The closed loop amplifier 822 is used to set the average voltage of the ramp. If the ramp is ranging between Va (valley) and Vb (peak), then the peak to peak, is Vb−Va. The amplitude can refer to peak to peak, and the average or mean amplitude as (Vb−Va)/2. So the desired level of the feedback ramp average voltage refers here to the mean value (Va+Vb)/2.

The ramp generator 820 also includes a timer 824 for controlling the switches M1 and M2.

Figure 8C:
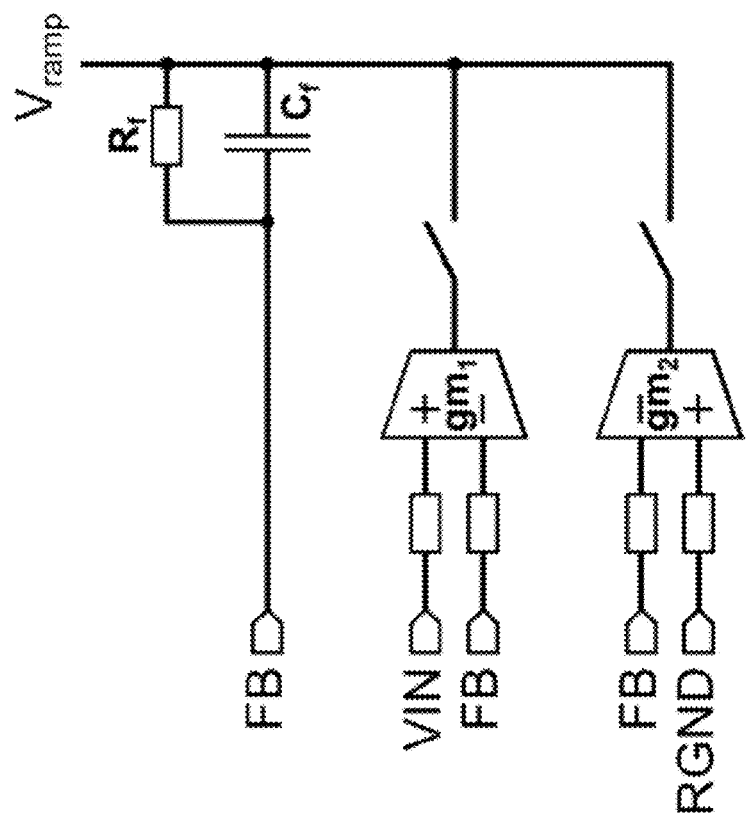
FIG. 8C is a diagram of yet another alternative implementation of a ramp generator for use in the circuit of FIG. 8A.
Figure 8B:
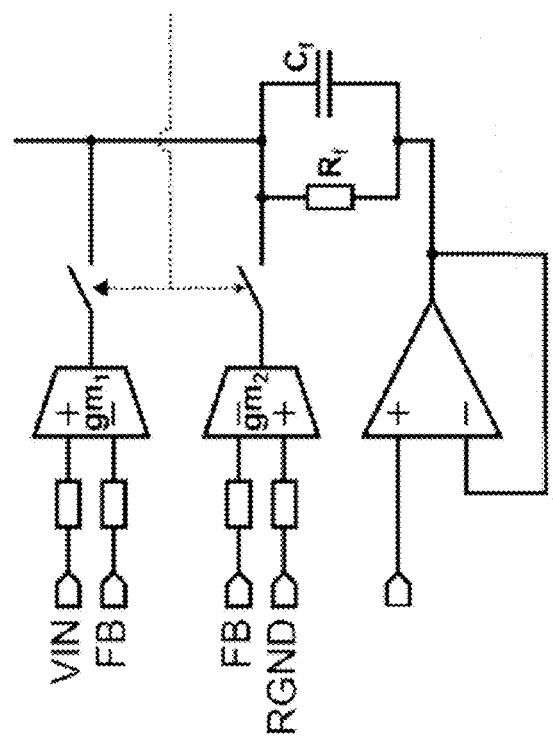
FIG. 8B is a diagram of an alternative implementation of a ramp generator for use in the circuit of FIG. 8A.

FIG. 8B shows another ramp generator for use in the circuit of FIG. 8A. This is a simpler implementation that provides fast feedback path, but in this case the ramp average voltage is near the output voltage.

FIG. 8C shows yet another ramp generator for use in the circuit of FIG. 8A. The closed loop amplifier permits to place the ramp average voltage where desired. However, the closed loop amplifier has a low output impedance.

In operation the logic circuit 835 sends a signal to the timer 824, which in turn control the operation of the switches M1 and M2. When M1 is on, M2 is off, the first transconductance amplifier gm1 is activated and the capacitor Cf charges.

When M2 is on, M1 is off, the second transconductance amplifier gm2 is activated and the capacitor Cf discharges. The charge and discharge of the capacitor Cf result in the feedback ramp voltage $V_{RAMP}$.

The timer circuit 824 is configured to calculate an ON time of the power supply for all phases: TON_ideal. For instance if the power supply has four phases TON_ideal=TON_phase1=TON_phase2=TON_phase3=TON_phase4. The TON of each individual phase may be different, but in most cases, they will be identical or similar. The TON_ideal is based on the input voltage VIN and the output voltage VOUT of the power supply following the equation: TON_ideal=Tsw VOUT/VIN where Tsw is the desired switching period of the power-switches. The switching cycle of M1 and M2 is determined by TON_ideal divided by the number of active phases of the power supply. For instance, if TON_ideal=100 ns and the power supply has 1 phase then the switching cycle is 100 ns. If the power supply has 4 phases which are all activated, then the switching cycle is 25 ns. If the power supply has 4 phases but only two are activated, then the switching cycle is 50 ns. The On-Time of the ramp is TON_Ideal/Number of phases.

Compared with the prior art, the feedback ramp voltage is therefore N time faster, where N represents the number of phases (in this numerical example 4 times faster). This permits the use of a single control signal for controlling all phases.

Optionally, the logic circuit 835 may be connected to a current measurement circuit 860 having an input for receiving a total output average current of all phases I_avg_total. The set current measurement circuit 860 may be implemented in different ways, for instance as an Analog to Digital Converter or as a set of comparators.

Optionally the controller 800 may also include a ramp amplitude adjuster 840 coupled to a duty cycle estimator 850 for adjusting the amplitude of the feedback ramp signal adaptively. In operation the ramp amplitude adjuster 840 receives the duty cycle from the duty cycle estimator 850, and in turn changes the transconductance gm1 and gm2 to adjust the amplitude of the ramp signal.

Figure 8D:
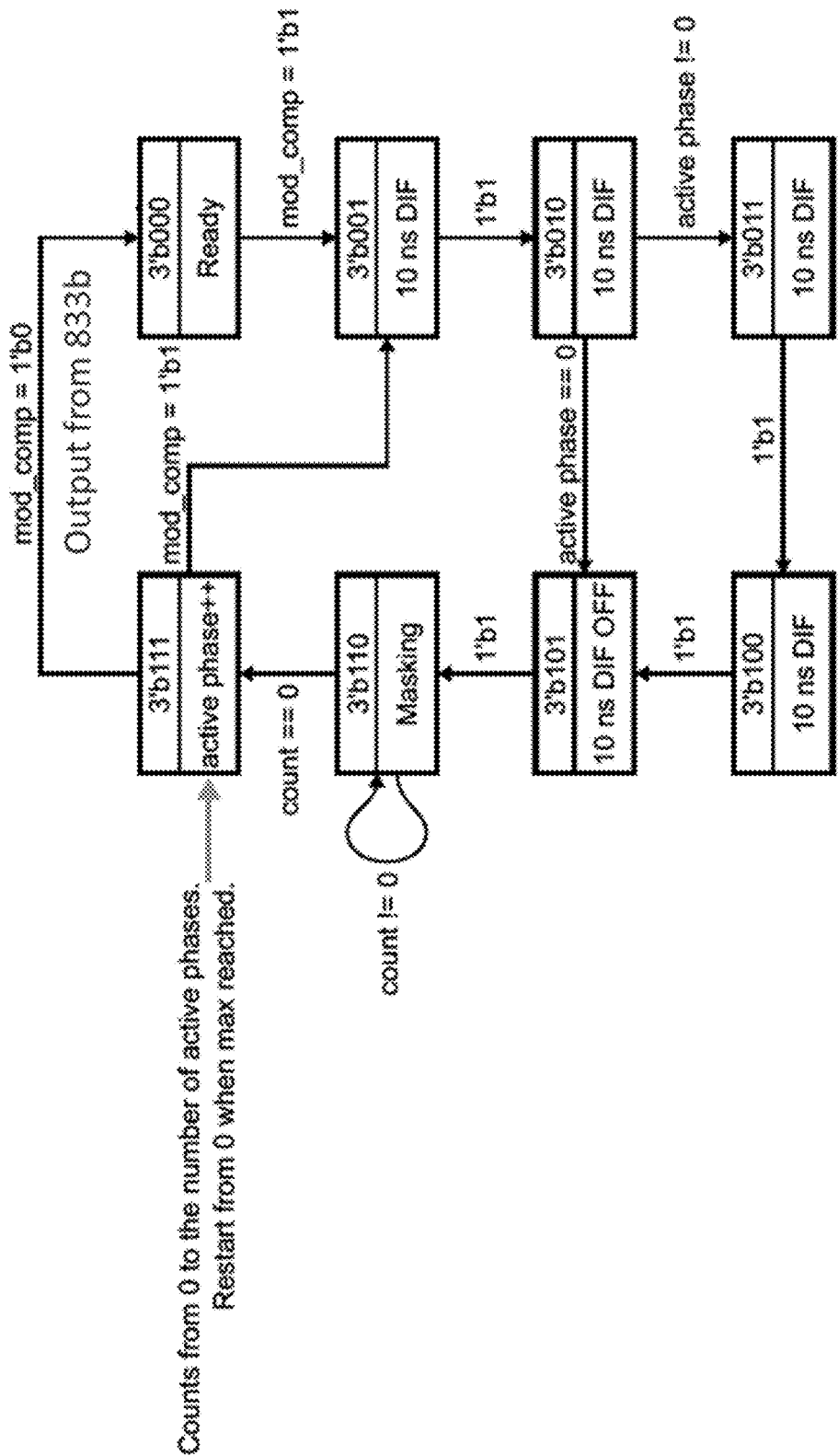
FIG. 8D is a functional diagram of a state machine for generating the control signal.

FIG. 8D is a functional diagram a state machine for generating the control signal. As mentioned above the logic circuit 835 may be implemented as a state machine, such as a finite state machine FSM. References are provided using Verilog as a hardware description language. For instance 3'b010 means Binary (using 3 bits).

Figure 8E:
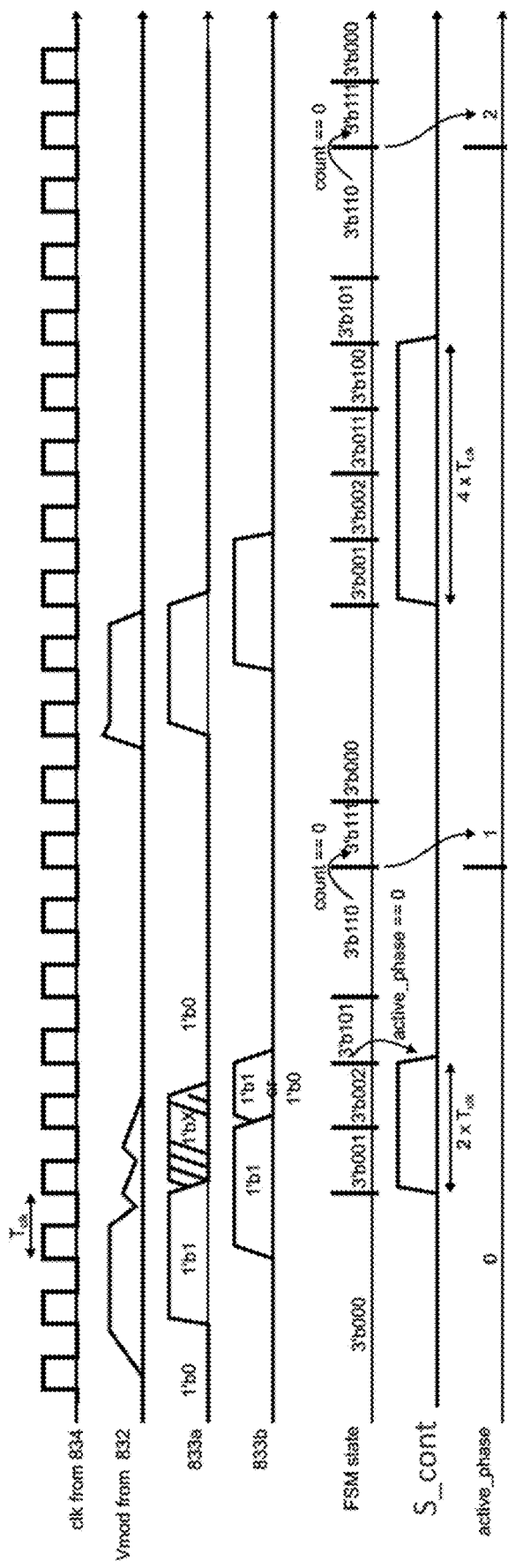
FIG. 8E is a plot illustrating the operation of the state machine of FIG. 8D.

FIG. 8E is a plot illustrating the operation of the state machine of FIG. 8D. The plot shows the waveforms of the clock signal from the clock 834, the modulation signal VMOD provided by comparator 832, the outputs of the D flip-flops 833a and 833b, the FSM state, the control signal S_cont, and the phase (0, 1, 2 or 3).

FIG. 9 illustrates an exemplary implementation of a power stage with two phases for use with the controller of FIG. 8A. The power stage 900 is also referred to as dual power stage DPU.

The first phase is provided with driver 910 and the second phase is provided with driver 920. Each driver is implemented in a similar way. The driver 910 includes a logic circuit 912 coupled to an oscillator OSC, a zero current detector ZCD, a low side sensor LS:Isns, an on time calculator Ton and optionally an average current sensor Iavg. The on time calculator may be configured to generate a ramp charging a capacitor C with a current (Vin−Vout)/R. Starting the ramp from 0 at the beginning of the On-time, the ramp reaches Vout at the ideal Ton. A voltage comparator can compare the ramp against Vout and will toggle at the end of the On-time.

The low side sensor LS:Isns is configured to measure the current through the low side switch. The logic circuit 910 includes a decoder (not shown) for decoding the control signal received via the single wire modulation transport interface (SWMTI). The outputs of each average current sensor are combined to generate the total average current I_avg_total. It will be appreciated that the topology of the circuit 900 may be extended to any number N of phases.

Figure 10:
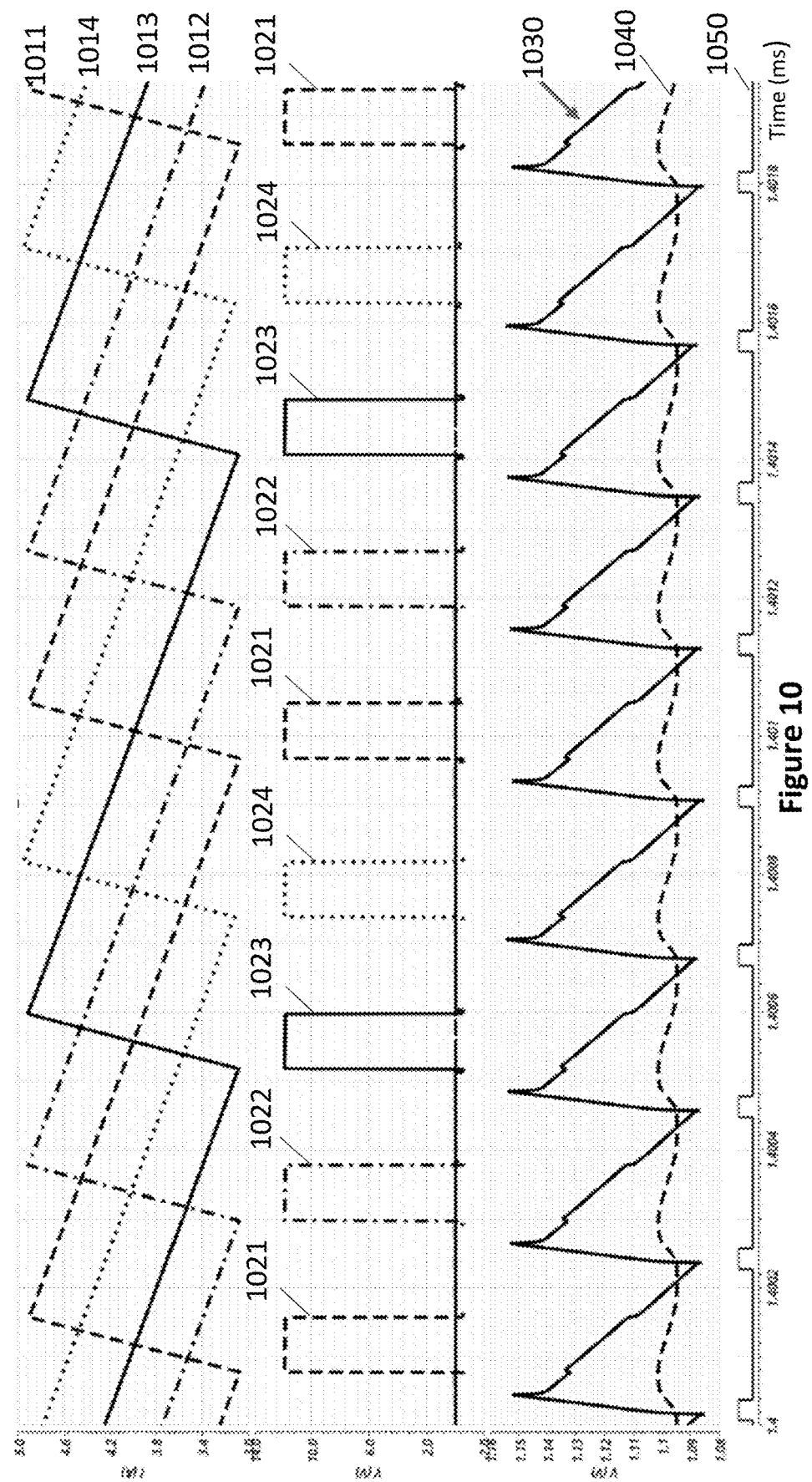
FIG. 10 is a waveform diagram illustrating the operation of the system of FIG. 6.

FIG. 10 is a waveform diagram illustrating the operation of the power supply of FIG. 6. FIG. 10 shows the inductor currents 1011, 1012, 1013 and 1014 of the first, second, third and fourth phase, respectively; the control signal with pulses: 1021 for the first phase, 1022 for the second phase, 1023 for the third phase and 1024 for the fourth phase; the feedback ramp signal 1030; the reference signal 1040 (positive input received by comparator 832), and the modulation signal VMOD 1050.

The control signal 1020 shows that the on time of each phase can be equally divided based on the number of phases, hence improving the stability and reliability of the power converter. The use of a single control signal for all phases facilitates phase balance.

Figure 11:
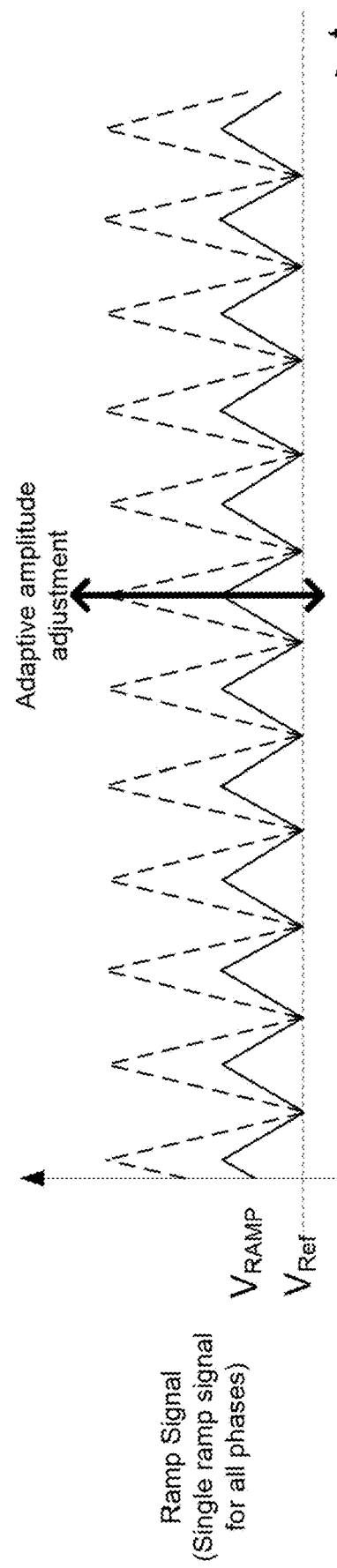
FIG. 11 is a waveform diagram showing the feedback ramp voltage with two different amplitudes.

FIG. 11 is a plot showing the feedback ramp voltage $V_{RAMP}$ before and after amplitude adjustment. The duty cycle has a significant influence on the ramp voltage. Different applications have different duty cycle ranges. A small ramp amplitude voltage provides better transient performances but increases noise susceptibility. When the ramp amplitude voltage is too small the converter may also become unstable. When the ramp amplitude voltage is large the converter is stable but may become noisy. By adjusting the ramp amplitude signal adaptively as a function of the duty cycle, the performance of the converter can be improved.

Figure 12:
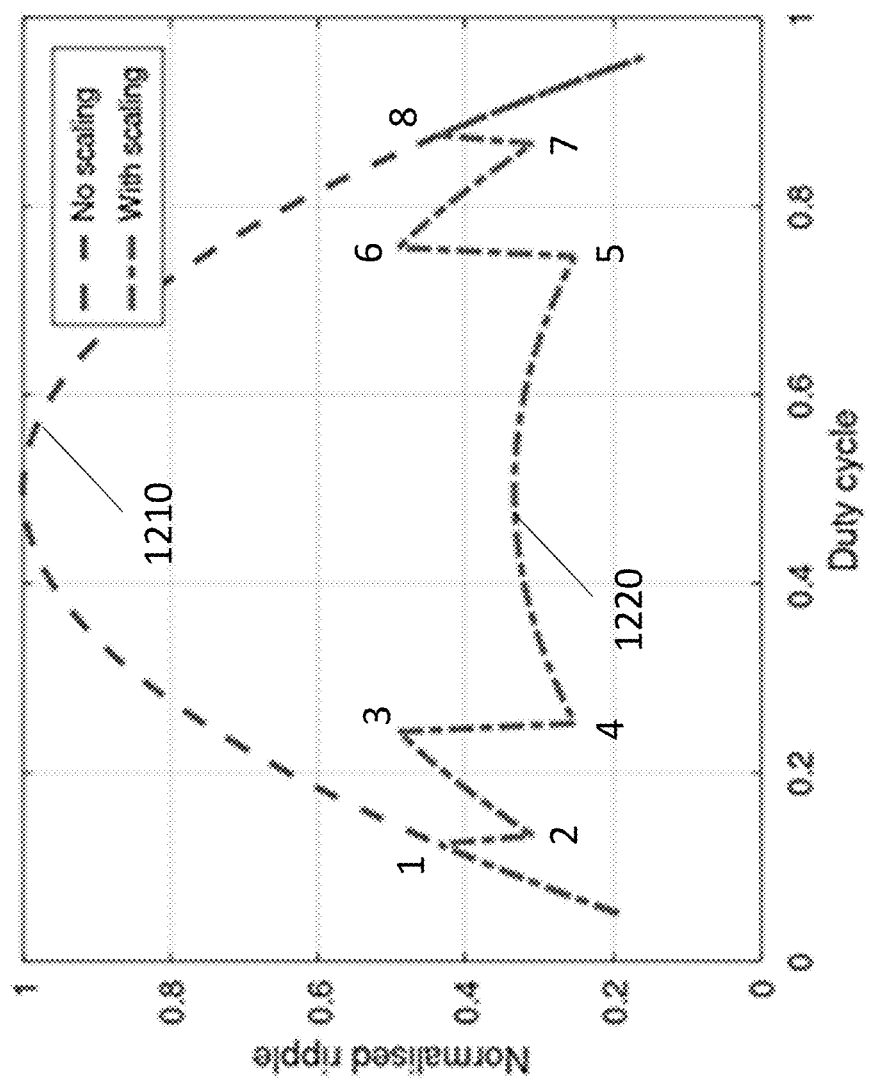
FIG. 12 is a plot of the normalised ramp amplitude as a function of the duty cycle obtained with and without scaling.

FIG. 12 is a plot of the normalised ramp amplitude as a function of the duty cycle obtained without scaling (waveform 1210) and with scaling (waveform 1220). The peak to peak value of the ramp normalised to a 0.5 duty cycle gives a value of 1. By changing gm1 and gm2 as a function of the ideal duty cycle of the converter, the ramp amplitude is maintained within a relatively small range around a desired amplitude level. Different duty cycles threshold levels are used at points 1-8 to adjust gm1 and gm2. The amplitude adjuster may be a state machine configured to adjust gm1 and gm2 at different duty cycle threshold levels. The transconductances gm1 and gm2 are both varying by the same ratio, i.e. a 0.5 variation would mean gm1 is divided by 2 and gm2 is divided by 2.

Figure 13:
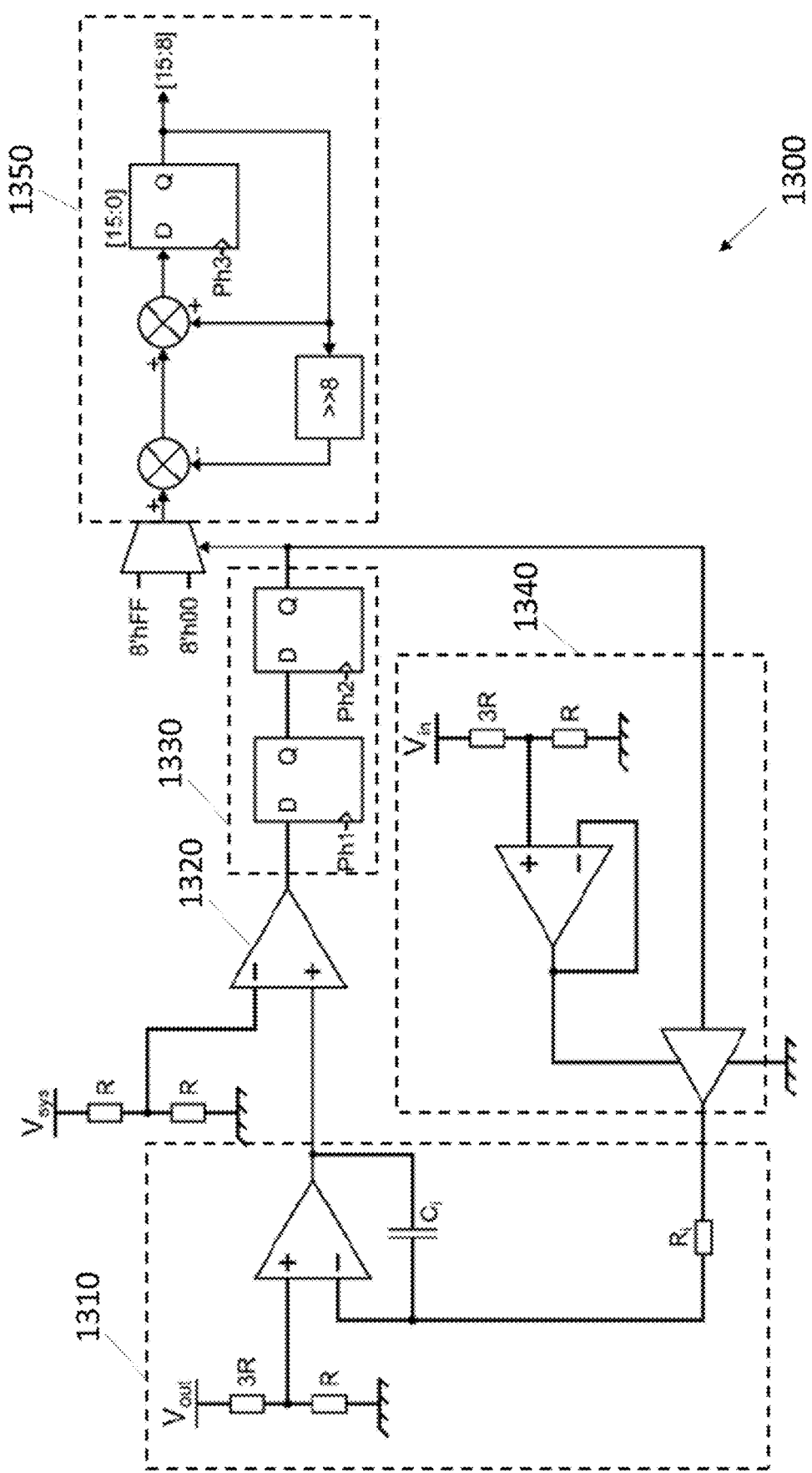
FIG. 13 is an exemplary implementation of a duty circuit estimator.

FIG. 13 is an exemplary embodiment of a duty circuit estimator for estimating the ideal duty cycle of the converter.

The circuit 1300 is a sigma delta ADC that includes an integrator 1310 coupled to a comparator 1320, a sample circuit 1330 and a DAC 1340. In operation the integrator 1310 integrates the error between the output voltage, Vout, and the modulation average value. The comparator 1320 compares that variation and the output of 1320 is sampled via 1330 and fed back to the DAC 1340. The sampled comparator output, 1 bit wide, also feeds a digital low pass filter 1350 that accumulates the 1 bit modulation and gives an 8 bit value.

Figure 14:
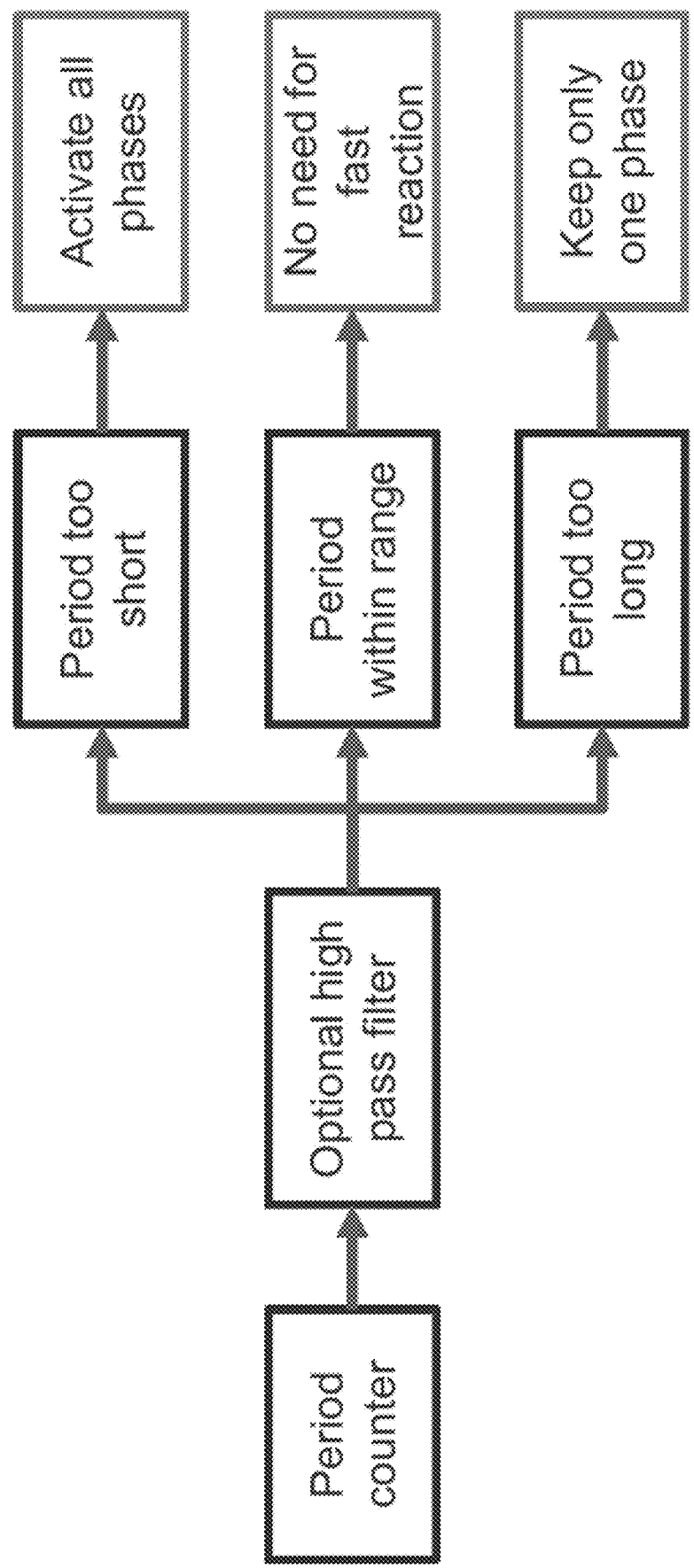
FIG. 14 is a diagram illustrating the operation of the circuit of FIG. 6 during transient load conditions.

FIG. 14 is a diagram illustrating the operation of the circuit of FIG. 6 during transient load conditions. In steady state, a phase operates out-of-phase with the other phases. When a load transient occurs, for instance when the load goes from a minimum to maximum load, it is possible to momentarily turn ON multiple phases at the same time to respond to the increased load. However, the circuit of FIG. 6 uses a single control signal which turns the phases ON in a serial manner as illustrated in FIG. 7.

FIG. 14 is a flow chart of a method for improving transient response using a single control signal. The period counter of the logic circuit 835 calculates the duration (or period) between successive pulses of the control signal. If the period/duration is too short (for instance less than a first threshold value) then all phases are activated. If the period/duration is too long (for instance greater than a second threshold value) then only one phase is maintained, and the other phases are deactivated. If the period/duration is within a desired range (for instance between the first and second threshold values) then there is no need for fast reaction. The information for activating or de-activating one or more phases may be encoded in the control signal 730 by the logic 835.

Figure 15:
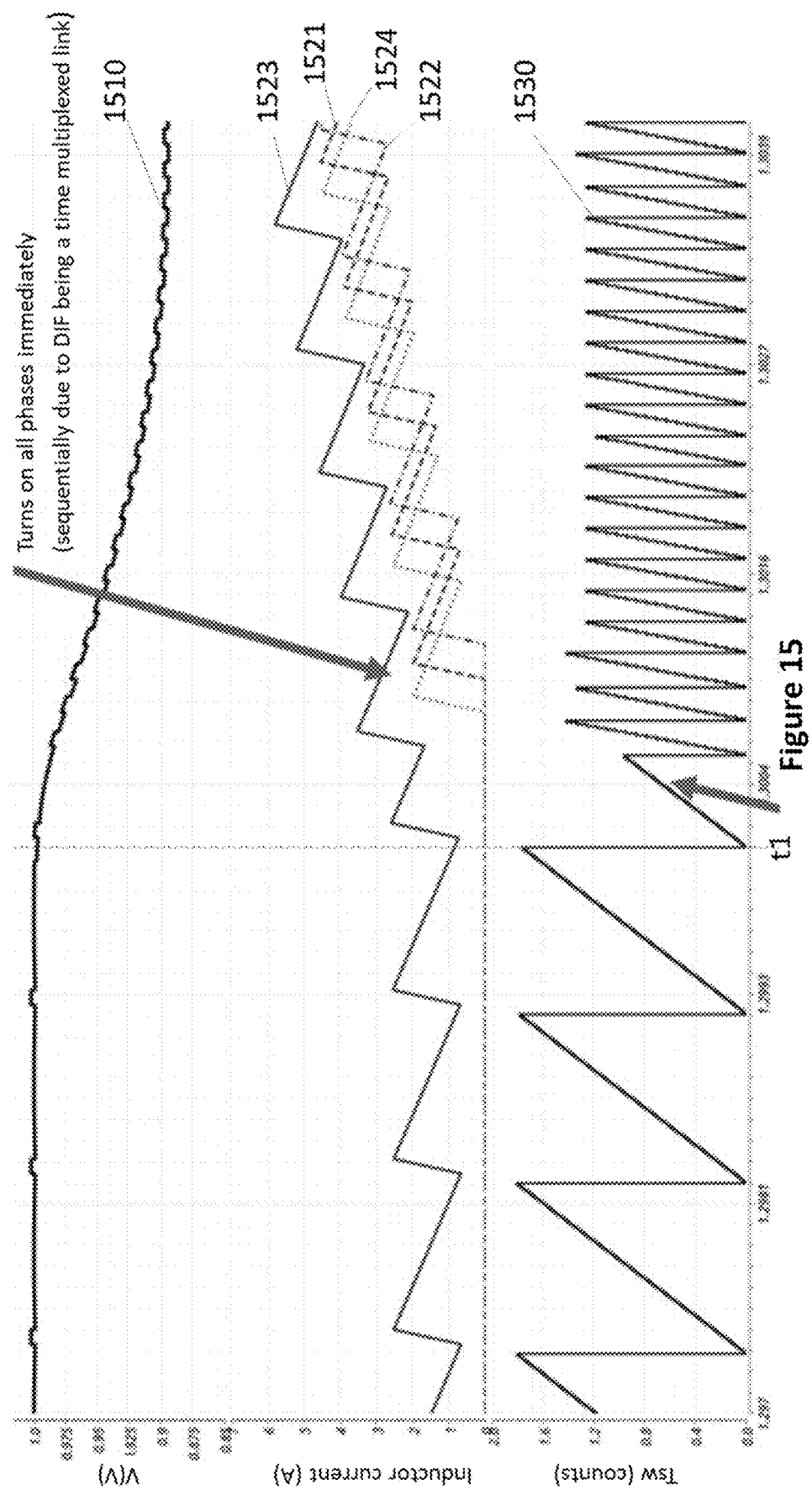
FIG. 15 is a plot showing the output voltage; the inductor current of each phase, and the switching period the circuit of FIG. 6 during load transient.

FIG. 15 is a plot illustrating the operation of the circuit of FIG. 6 during load transient. FIG. 15 shows the output voltage Vout 1510 of the converter; the inductor current 1521, 1522, 1523, 1524 for the first, second, third and fourth phase, respectively; and the switching period Tsw 1530 in number of counts.

Before the time t1 the converter operates in steady state using a single phase (phase 3) with an associated steady stage switching period. After the time t1 the converter enters a transient load condition. The switching period decreases and becomes shorter than the steady state switching period. In turn the other phases are activated sequentially (phase 4, then phase 1, then phase 2) so that all phases become activated.

Figure 16:
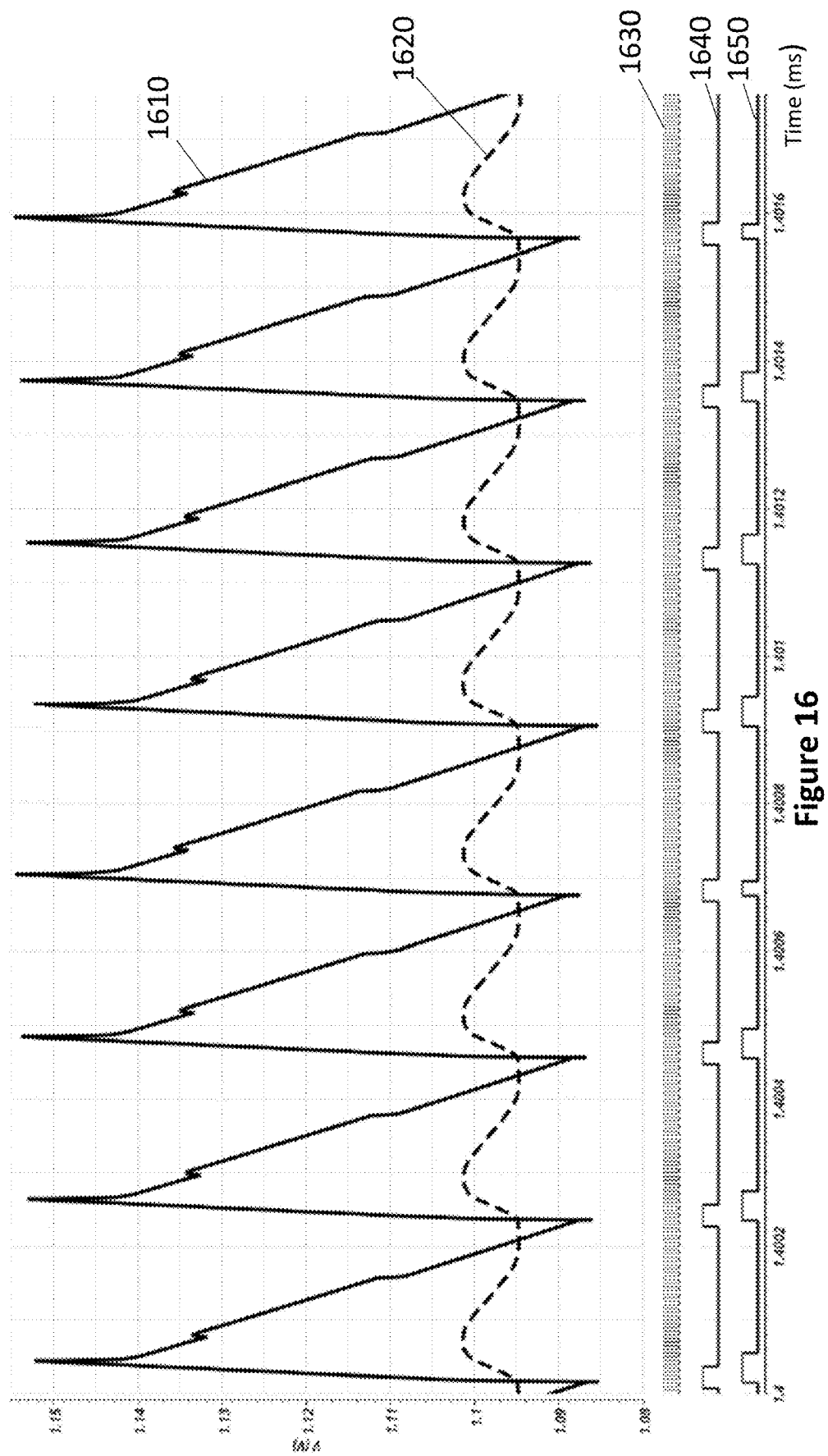
FIG. 16 is a plot showing the feedback ramp signal; the sampling clock signal, the modulation signal and the control signal of the circuit of FIG. 6.

FIG. 16 is another waveform diagram illustrating the operation of the system of FIG. 6. FIG. 16 shows the feedback ramp signal 1610; the reference signal 1620, the sampling clock signal 1630, the modulation signal VMOD 1640 and the control signal 1650.

The modulation signal VMOD is sampled by the D flip-flops 833a and 833b so that the switching frequency is known with an accuracy defined by the sampling period, that is the duration of the pulses T1, T3, T5, T7 of 730. The high frequency sampling (oversampling) of the voltage difference between the compensation signal Vcomp=Vref and the ramp signal Vramp prevents bus congestion and permits proper bus arbitration.

The controller of the description has been described for use with a buck COT converter, however, it will be appreciated the that the controller may also be used with a boost COT converter.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A controller for controlling a power stage having one or more phases, the controller comprising:
    a reference circuit adapted to generate a reference signal;
    a ramp generator adapted to generate a feedback ramp signal based on a feedback signal of the power stage; and
    a modulator adapted to generate a control signal for controlling at least one phase of the power stage, wherein the modulator comprises:
        a comparator adapted to compare the feedback ramp signal with the reference signal to obtain a modulation signal;
        a sampling circuit configured to sample the modulation signal and to generate a digital modulation signal;
        a logic circuit configured to generate the control signal based on the digital modulation signal; and
        an oscillator coupled to the sampling circuit and the logic circuit.

2. The controller as claimed in claim 1, wherein the feedback ramp signal has a frequency that is function of number of active phases of the power stage.

3. The controller as claimed in claim 1, wherein the control signal comprises a series of pulses, each pulse being associated with a corresponding phase of the power stage.

4. The controller as claimed in claim 3, wherein each pulse is associated with an on time of the corresponding phase.

5. The controller as claimed in claim 1, wherein the logic circuit comprises a counter configured to calculate a duration between successive pulses of the control signal.

6. The controller as claimed in claim 1, wherein the logic circuit is configured to encode the digital modulation signal for a specific protocol.

7. The controller as claimed in claim 1, wherein the logic circuit is a state machine.

8. The controller as claimed in claim 1, wherein the ramp generator comprises:
    a capacitor;
    a first transconductance amplifier coupled to the capacitor via a first switch;
    a second transconductance amplifier coupled to the capacitor via a second switch; and
    a timer configured to control the first and second switches.

9. The controller as claimed in claim 8, comprising a closed loop operational amplifier.

10. The controller as claimed in claim 1, further comprising a duty cycle estimator configured to estimate a duty cycle of the power stage and a ramp amplitude adjuster configured to adjust an amplitude of the feedback ramp signal based on the estimated duty cycle.

11. A power supply comprising the controller and the power stage as claimed in claim 1.

12. The power supply as claimed in claim 11, wherein the controller is coupled to the power stage via a single wire interface.

13. The power supply as claimed in claim 11, wherein the power stage comprises a plurality of phases, each phase comprising a high side power switch coupled to a low side power switch at a switching node.

14. The power supply as claimed in claim 13, wherein each phase the power stage comprises a driver, and wherein the driver comprises a decoder for decoding the control signal.

15. The power supply as claimed in claim 14, wherein the decoder is configured to measure a pulse width of each pulse of the control signal and compare the measured pulse width with a predefined pulse width value.

16. The power supply as claimed in claim 11, wherein the power supply is a constant on time converter.

17. A method of controlling a power stage having one or more phases, the method comprising:
- generating a reference signal;
- generating a feedback ramp signal based on a feedback signal of the power stage;
- comparing the feedback ramp signal with the reference signal to obtain a modulation signal;
- sampling, according to a clock signal provided by an oscillator, the modulation signal to generate a digital modulation signal; and
- generating, based on the digital modulation signal and according to the clock signal provided by the oscillator, a control signal for controlling at least one phase of the power stage.

18. The method as claimed in claim 17, wherein the control signal is a single control signal.

19. The method as claimed in claim 17, comprising:
- calculating a duration between successive pulses of the control signal; and
- activating one or more phases if the duration is less than a first threshold value; or
- deactivating one or more phases if the duration is more than a second threshold.

\* \* \* \* \*